United States Patent [19]

Borowski et al.

[11] 4,153,352
[45] May 8, 1979

[54] ALTERED NEGATIVE-FEEDBACK DIAPHRAGM CONTROL DURING IMPLEMENTATION OF IMAGE FADEOVER IN A MOTION-PICTURE CAMERA

[75] Inventors: Kurt Borowski, Aschheim; Friedrich Stumpf; Theodor Huber, both of Munich, all of Fed. Rep. of Germany

[73] Assignee: AGFA-Gevaert A.G., Leverkusen, Fed. Rep. of Germany

[21] Appl. No.: 904,554

[22] Filed: May 10, 1978

[30] Foreign Application Priority Data

May 13, 1977 [DE] Fed. Rep. of Germany ....... 2721569

[51] Int. Cl.² ............................................. G03B 21/36
[52] U.S. Cl. .................................. 352/91 C; 352/141
[58] Field of Search ................ 352/91 R, 91 C, 91 S, 352/141; 354/31

[56] References Cited

U.S. PATENT DOCUMENTS

| | | | |
|---|---|---|---|
| 4,003,646 | 1/1977 | Freudenschuss et al. | 352/141 |
| 4,106,864 | 8/1978 | Burgermann | 352/91 C |
| 4,106,865 | 8/1978 | Burgermann | 352/91 C |
| 4,116,552 | 9/1978 | Wagensonner | 352/141 |
| 4,118,714 | 10/1978 | Okajima et al. | 352/141 |

*Primary Examiner*—Russell E. Adams

*Attorney, Agent, or Firm*—Michael J. Striker

[57] ABSTRACT

Normally, the negative-feedback diaphragm control system of the motion-picture camera works off a through-the-lens photosensitive element. However, when an image fadeover is to be effected, the lower than normal-operation aperture size commanded for the diaphragm results in a decrease in the light incident on the through-the-lens photosensitive element creating problems if the diaphragm control system is to continue to respond to scene-light changes during the lower than normal-operation aperture-size situation. Accordingly, the through-the-lens photosensitive element is switched out of the control system, and a second photosensitive element is switched in. The second photosensitive element does not operate through-the-lens, but instead is positioned behind an auxiliary light attenuator the front of which is exposed to ambient scene light. The auxiliary light attenuator is coupled to the diaphragm and diaphragm-adjusting motor. When the second photosensitive element is switched in, also switched in is a corrective unit which redefines what the equilibrium state of the negative-feedback diaphragm control system is to be, to take into account the difference in light incident upon the second as opposed to the first photosensitive element.

6 Claims, 1 Drawing Figure

U.S. Patent   May 8, 1979   4,153,352
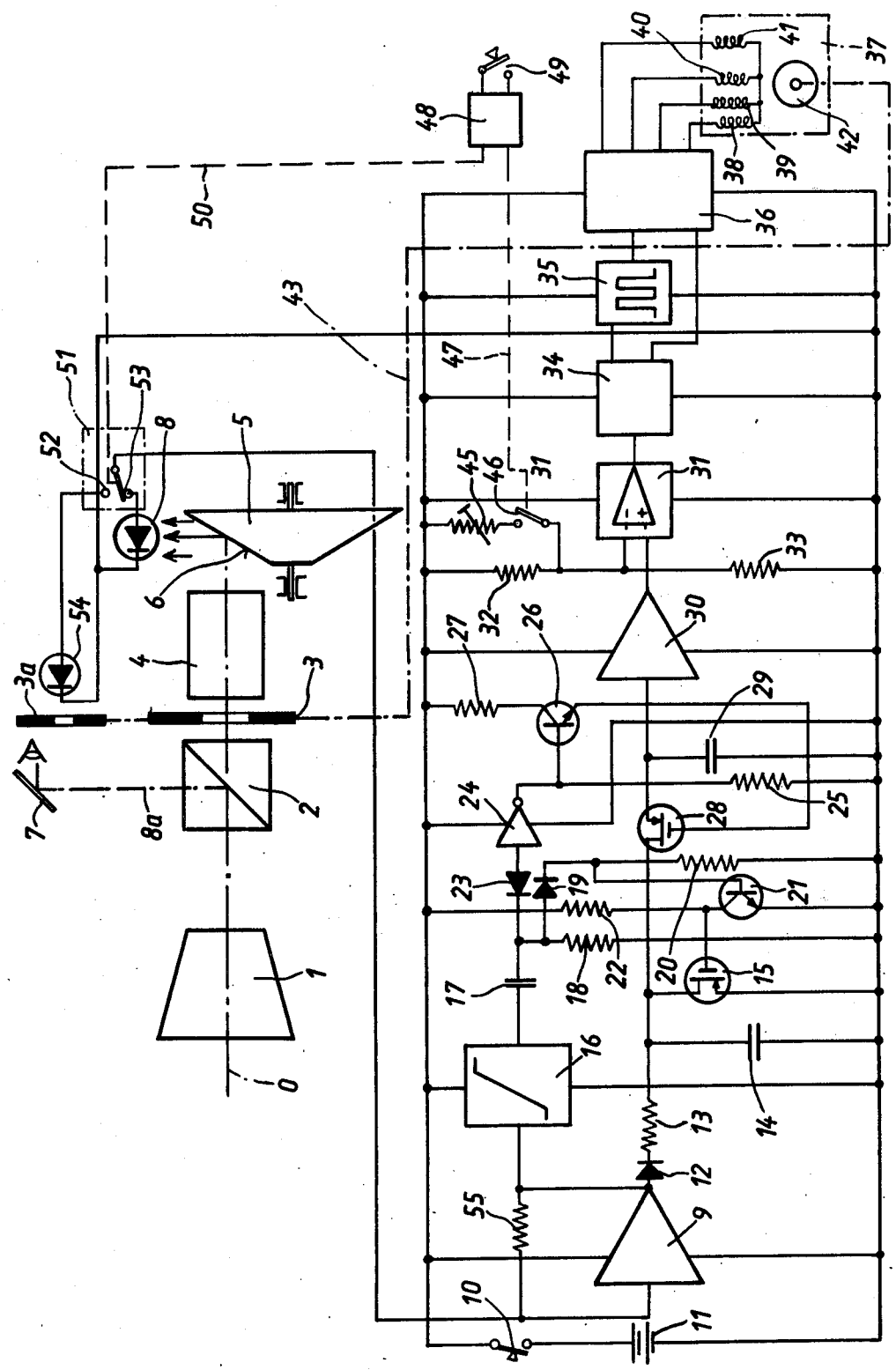

ALTERED NEGATIVE-FEEDBACK DIAPHRAGM CONTROL DURING IMPLEMENTATION OF IMAGE FADEOVER IN A MOTION-PICTURE CAMERA

BACKGROUND OF THE INVENTION

The invention relates to motion-picture cameras provided with an automatic diaphragm-control system, the photosensitive element of which receives light actually passing through the objective of the camera. In particular, the invention relates to such cameras which are furthermore provided with means for implementing image fadeovers. An image fadeover comprises an image fade-out followed by an image fade-in. The fade-out is implemented by applying an imbalancing effect to the diaphragm-control system, causing the diaphragm aperture size to decrease. The subsequent fade-in is implemented by removing the imbalancing effect, so that the diaphragm aperture decrease is removed. The amount of the aperture-size decrease for fade-out and subsequent increase for the fade-in is conventionally a predetermined amount.

Often, in such systems, the aperture-error signal is an analog signal, but the analog signal is then evaluated to produce a digital signal which then actually controls the operation of the diaphragm-adjusting motor; i.e., when the adjusting motor is to operate, the control signal applied to it is a simple on-off signal not containing analog aperture-error information.

Such conventional motion-picture cameras have the advantage that, when the system is deliberately imbalanced to implement a fade-out, the amount by which the aperture size then decreases is constant and independent of what the aperture size happened to be at the moment the fade-out was commanded. Furthermore, the scene-light-dependent negative-feedback action of the diaphragm control system continues, although with the fade-out aperture-size decrease superimposed upon it.

In particular, when the control signal for the diaphragm-adjusting motor is not analog but digital, the rate at which the aperture size changes during fade-ins and fade-outs is predetermined, and the total duration of the fade-out or fade-in is independent of the prevailing value of scene-light intensity. When the aperture-size has been decreased for such an effect, the amount of light reaching the through-the-lens photosensitive element of the diaphragm control system is very low. As a result, if one uses a photoresistor as the photosensitive element, its sluggishness in responding to scene-light changes becomes problematic. Additionally, its sluggishness of response can vary in dependence upon its recent history; e.g., the response sluggishness of a photoresistor which has just previously been exposed to no light at all or extremely low light is much greater than if the photoresistor had just been previously been exposed to a comparatively higher amount of light.

If one uses instead a silicon photodiode, then one must deal with the disadvantage of considerably lower photocurrent than is achieved with a photoresistor. When a silicon photodiode is used, and the diaphragm is in its aperture-size-decreased state, the photocurrent may be on the order of only pico- or nanoamperes, requiring considerable expense for amplification. A further problem relates to the fact that the dark current (zero-incident-light current) of such a photodiode will constitute a sizable fraction of its total current.

SUMMARY OF THE INVENTION

It is a general object of the invention to provide a motion-picture camera of the type in question, in which the diaphragm control system can properly respond to scene-light changes even when the diaphragm is in its decreased-aperture-size state during the course of implementing an image fadeover.

In the preferred embodiment of the invention, an auxiliary diaphragm or light attenuator is coupled to (or is even one structure with) the main diaphragm of the camera. The auxiliary light attenuator transmits ambient scene light directly onto an auxiliary photosensitive element. When the fade-out of an image fadeover, or a simple fadeout not forming part of an image fadeover, is to be performed, the through-the-lens photosensitive element is switched out of the diaphragm-control system and the auxiliary photosensitive element is switched in.

At the same time, there is additionally switched into the diaphragm-control system a corrective stage, which redefines what the equilibrium condition of the negative-feedback system is to be, to take into account the difference between the amount of light incident upon the through-the-lens photosensitive element and the amount of light incident upon the auxiliary photosensitive element, the latter being exposed to ambient scene light through the intermediary of only the auxiliary light attenuator coupled to the main diaphragm. In this way, during the course of a fadeover, or of a simple fade-out or fade-in, the negative-feedback action of the diaphragm-control system is determined by the ambient scene light, which is stronger than the light passing through the camera objective, thereby presenting the negative-feedback system with a much larger scene-light-indicating signal for signal processing.

Preferably, both photosensitive elements are silicon photodiodes, and the auxiliary light attenuator located in front of the auxiliary photodiode and coupled to the main diaphragm is itself a diaphragm. Advantageously, the auxiliary diaphragm can be of one piece with the main diaphragm. The corrective stage referred to above can be an adjustable resistor, switched into the diaphragm-control circuit simultaneously with the switching-in of the auxiliary photodiode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE depicts one exemplary embodiment of the invention.

DESCRIPTION OF THE PREFERRED EMBODIMENTS

In the FIGURE, letter O indicates the optical axis of a (for the most part non-illustrated) motion-picture camera. The camera includes a first objective unit 1, a deflecting mirror 2, an aperture-establishing diaphragm 3, a second diaphragm 3a coupled with the first diaphragm 3, a further objective unit 4, and a rotary shutter 5 having a mirrored surface 6. Numeral 7 denotes a mirror, serving to deflect light 8a to the viewfinder.

The rotary reflective shutter 5 alternates during its rotation between a light-transmitting phase in which it transmits incoming light to the camera film and a light-reflecting phase in which it deflects incoming (through-the-lens) light onto a silicon photodiode 8. Photodiode 8 is connected in the input circuit of an amplifier 9. A switch 10 is closed when the illustrated circuit is to be connected to the camera battery 11. The output of amplifier 9 is connected via a diode 12 and a resistor 13 to an integrating capacitor 14. A field-effect transistor 15 is connected across the integrating capacitor 14.

The output of amplifier 9 is additionally connected to the input of a pulse shaper 16, which serves to generate a well-shaped rectangular pulse the leading and trailing ends of which coincide with the reflecting-to-transmitting and transmitting-to-reflecting phase transitions of the rotary shutter. Connected to the output of pulse shaper 16 is a differentiator comprising a capacitor 17 and a resistor 18. The output of differentiator 17, 18 is connected to the anode of a positive-pulse-transmitting diode 19, whose cathode is connected via a resistor 20 to the negative battery terminal. The cathode of diode 19 is also connected to the base of a transistor 21, whose collector is connected to the control electrode of FET 15 and also via a resistor 22 to the positive battery terminal.

The output of differentiator 17, 18 is furthermore connected via a negative-pulse-transmitting diode 23 to the input of an inverter 24, whose output is connected to a resistor 25 and to the base of a transistor 26. The collector of transistor 26 is connected via a resistor 27 to the positive battery terminal. The emitter of transistor 26 is connected to the control electrode of a further FET 28, whose main-electrode path is connected between the integrating capacitor 14 and a storage capacitor 29. Storage capacitor 29 is connected in the input circuit of an impedance converter 30, the latter serving to transmit the storage-capacitor voltage without discharging the storage capacitor. The output of impedance converter 30 is connected to the non-inverting input of an operational amplifier 31, whose inverting input is connected to the tap of a voltage divider 32, 33.

An adjustable resistor 45 is connectable in parallel to the voltage-divider resistor 32 by closing a switch 46. Switch 46 is mechanically coupled via a linkage 47 to a fadeover unit 48, whose fadeover-command switch is denoted by 49. A mechanical linkage 50 couples the fadeover unit 48 to a switchover unit 51 containing switchover contacts 52, 53. Switchover unit 51 serves to alternatively connect either the silicon photodiode 8 or else the silicon photodiode 54 into the input circuit of amplifier 9. Photodiode 54 is located behind the auxiliary diaphragm or light attenuator 3a, and is exposed through the latter to ambient scene light. Numeral 55 denotes the feedback resistor of the amplifier 9. The aforementioned resistor 45 is so dimensioned as to set the steady-state (equilibrium) level of the operational amplifier 31 to a value appropriate for achieving correct exposures upon a switchover to the more strongly illuminated silicon photodiode 54. The silicon photodiode 54, when switched into the circuit to replace silicon photodiode 8, receives an amount of light greater than that which would be received by photodiode 8, greater by an amount which includes such factors as the fraction of incoming (through-the-lens) light lost within the vario-objective, within the main optics of the camera, and lost off the reflective surfaces.

Connected to the output of operational amplifier 31 is an analog-input-signal/digital-output-signal logic circuit 34 having a stop-go output (upper output) and a direction-control output (lower output). It does or does not produce a signal on its stop-go output and produces either an aperture-increase or aperture-decrease signal on its direction-control output, depending upon the magnitude and sense of the diaphragm error indicated by the input signal received by logic circuit 34. For example, if the diaphragm-error signal received by logic circuit 34 is in a middle range (corresponding to aperture errors which are either zero or close to zero), logic circuit 34 does not produce a signal at its stop-go (upper) output. In contrast, if the diaphragm-error signal received is in a lower first range or a higher third range (corresponding to unacceptable aperture error in one sense or the other), then in both cases circuit 34 produces a signal (go) at its stop-go (upper) output. Likewise, logic circuit 34 produces an aperture-increase signal when the aperture-error signal is in one of the two outer ranges and an aperture-decrease signal when the aperture-error signal is in the other of the two outer ranges. The provision of a middle range serves to prevent hunting.

The stop-go (upper) output of circuit 34 is connected to a pulse generator 35, the output of which is connected to a stepper-motor control circuit 36. Pulse generator 35 transmits pulses to the stepper-motor control circuit 36 when circuit 34 produces an output signal on its stop-go output; otherwise pulse generator 35 does not transmit pulses to the stepper-motor control circuit. The direction-control (lower) output of logic circuit 34 is connected to the direction-selecting (lower) input of stepper-motor control circuit 36 and causes the characteristic ring-counting action of circuit 36 to proceed in one or the other direction, depending upon whether aperture size is to be increased or decreased. A stepper motor is denoted in toto by numeral 37 and comprises four stator windings 38, 39, 40, 41 and a rotor 42. In conventional manner, the rotor 42 is caused to turn in one direction or the other, by energizing the four windings 38-41 successively with one or the opposite succession. A linkage 43 couples the stepper-motor output to the coupled-together diaphragm 3 and auxiliary light attenuator 3a.

During the reflecting phase of operation of the rotary shutter 5, a voltage of generally trapezoidal waveform is applied to the input of amplifier 9. This trapezoidal voltage is converted into a rectangular pulse by pulse shaper 16, and the leading and trailing flanks of the rectangular pulses are differentiated by differentiator 17, 18. The voltage appearing at the tap between capacitor 17 and resistor 18 is a positive pulse at the commencement of the reflecting phase and is a negative pulse at the conclusion of the reflecting phase.

During the course of the reflecting phase, the trapezoidal voltage is integrated by the integrating capacitor 14. During the reflecting phase, diode 12 prevents backwards discharge of the charge accumulating on integrating capacitor 14.

The positive differentiator-output pulse produced at the commencement of the reflecting phase renders briefly conductive the hitherto non-conductive transistor 21; as a result, the likewise hitherto non-conductive FET 14 is rendered briefly conductive and thereby discharges the integrating capacitor 14. This assures that the integrating capacitor 14 is always in discharged condition at the start of the reflecting phase. The negative differentiator-output pulse produced at the conclusion of the reflecting phase is transmitted by diode 23, inverted by inverter 24, and applied to the base of transistor 26 as a positive pulse. The hitherto non-conductive transistor 26 is now rendered briefly conductive, and likewise therefore the hitherto non-conductive FET 28 is rendered briefly conductive. During the brief conduction by FET 28, charge is transmitted from one of the two capacitors 14, 29 to the other. I.e., if the scene-brightness information constituted by the charge of capacitor 14 is higher than that already registered by storage capacitor 29, the latter will pull charge from the former; in contrast, if the scene-brightness information constituted by the charge on capacitor 14 is lower than that already registered by storage capacitor 29, the latter will lose charge to capacitor 14 and the registered scene-brightness information thereby will be corrected downwards.

The scene-brightness-indicating voltage on storage capacitor 29 is transmitted by impedance converter 30 to the non-inverting input of operational amplifier 31, and an aperture-error signal is produced at the output of the latter.

When the photographer desires an image fadeover, he activates fadeover command switch 49. Persons skilled in the art will understand that an image fadeover is implemented by performing an image fade-out, followed by a re-wind, followed by an image fade-in. For simplicity, the conventional means effecting the rewind are not illustrated, and only the fade-out and fade-in component of overall fadeover need be referred to. When switch 49 is closed, this first effects a fade-out. In particular, switchover unit 51 changes from its illustrated to its other setting, thereby replacing photodiode 8 with photodiode 54, and switch 46 closes, thereby connecting corrective resistor 45 into the voltage divider 32, 33. The steady state is lost in a sense commanding aperture decrease, and the size of the aperture decreases by a certain amount. If, in addition to this deliberate disruption of the steady state, scene light is also changing, the system superimposes scene-light-dependent corrective action upon the pure fade-out action, in dependence upon scene-light information received from photodiode 54. When the subsequent image fade-in is to be performed, switchover unit 51 and switch 46 are returned to their illustrated settings, thereby switching back to through-the-lens photodiode 8 and disconnecting corrective resistor 45 from voltage divider 32, 33. The aperture size increases, and scene-light-dependent operation is again performed in dependence upon the light sensed by photodiode 8.

It will be understood that each of the elements described above, or two or more together, may also find a useful application in other types of circuits differing from the types described above.

While the invention has been illustrated and described as embodied in the context of a motion-picture camera whose through-the-lens photosensitive element receives light from an alternately reflecting and transmitting rotary shutter during the reflecting phase of the latter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motion-picture camera capable of implementing fade-out, fade-in and/or fadeover transition effects, the camera comprising a camera objective; an adjustable diaphragm cooperating with the camera objective; negative-feedback diaphragm control means operative for controlling the diaphragm aperture, the control means including a diaphragm-adjusting motor coupled to the diaphragm, first photosensitive means positioned to receive light passing through the objective for generating a light-dependent signal, means for deriving from the light-dependent signal an analog aperture-error signal, and means for deriving from the analog aperture-error signal a digital control signal controlling the operation of the diaphragm-adjusting motor; and transition-implementing means activatable by the user for implementing a transition effect and operative when activated for disturbing the equilibrium of the negative-feedback diaphragm control means in a sense causing the diaphragm aperture to decrease by a predetermined amount, the transition-implementing means including an auxiliary light attenuator coupled to the diaphragm and to the diaphragm-adjusting motor and located with its front exposed to ambient scene light, second photosensitive means positioned behind the auxiliary light attenuator to receive ambient scene light through the auxiliary light attenuator, switchover means operative for disconnecting the first photosensitive means from the negative-feedback diaphragm control means and connecting the second photosensitive means into the negative-feedback diaphragm control means, and compensating means operative for redefining the equilibrium state of the negative-feedback diaphragm control means to correct for the difference between the light incident upon the second as opposed to the first phorosensitive means.

2. A motion-picture camera as defined in claim 1, wherein the first and second photosensitive means respectively consist of a first and a second photodiode.

3. A motion-picture camera as defined in claim 1, wherein the auxiliary light attenuator is an auxiliary diaphragm.

4. A motion-picture camera as defined in claim 3, wherein the two diaphragms are parts of a single structure.

5. A motion-picture camera as defined in claim 1, wherein the compensating means comprises a resistor and means switching the resistor into the diaphragm control means when the second photosensitive means is switched into the diaphragm control means.

6. A motion-picture camera capable of implementing fade-out, fade-in and/or fadeover transition effects, the camera comprising a camera objective, an adjustable diaphragm cooperating with the camera objective; an auxiliary light attenuator located with its front exposed to ambient scene light; negative-feedback diaphragm control means operative for controlling the diaphragm aperture, the control means including an adjusting motor coupled to the diaphragm, first photosensitive means positioned to receive light passing through the objective and diaphragm and second photosensitive means positioned behind the auxiliary light attenuator to receive ambient scene light through the auxiliary light attenuator, and operative for generating respective first and second light-dependent signals, means normally operative for deriving an aperture-error signal from the first light-dependent signal, and means operative for deriving from the aperture-error signal a motor control signal controlling the operation of the diaphragm-adjusting motor; and means activatable by the user for implementing a transition effect and operative when activated for disturbing the equlibrium of the negative-feedback diaphragm control means in a sense causing the diaphragm aperture to decrease, the transition-implementing means including means causing the aperture-error signal deriving means to derive the aperture-error signal in dependence upon the second light-dependent signal.

* * * * *